(12) United States Patent
Gupta et al.

(10) Patent No.: US 8,365,174 B2
(45) Date of Patent: Jan. 29, 2013

(54) SYSTEM AND METHOD FOR MODIFYING SCHEDULING OF QUERIES IN RESPONSE TO THE BALANCING AVERAGE STRETCH AND MAXIMUM STRETCH OF SCHEDULED QUERIES

(76) Inventors: Chetan Kumar Gupta, Austin, TX (US); Song Wang, Austin, TX (US); Abhay Mehta, Austin, TX (US)

( * ) Notice: Subject to any disclaimer, the term of this patent is extended or adjusted under 35 U.S.C. 154(b) by 1141 days.

(21) Appl. No.: 12/251,272

(22) Filed: Oct. 14, 2008

(65) Prior Publication Data

US 2010/0095299 A1 Apr. 15, 2010

(51) Int. Cl.
*G06F 9/46* (2006.01)
*G06F 17/30* (2006.01)
(52) U.S. Cl. .................. 718/102; 718/103; 707/769
(58) Field of Classification Search .................. None
See application file for complete search history.

(56) References Cited

U.S. PATENT DOCUMENTS

| 6,502,062 | B1 | 12/2002 | Acharya et al. |
| 7,953,727 | B2 * | 5/2011 | Adair et al. ............ 707/715 |
| 2003/0087649 | A1 * | 5/2003 | Bhatia et al. ............ 455/456 |
| 2004/0148420 | A1 | 7/2004 | Hinshaw et al. |
| 2006/0069803 | A1 | 3/2006 | Clark et al. |
| 2006/0155697 | A1 * | 7/2006 | Rosengard ............ 707/6 |
| 2007/0288649 | A1 | 12/2007 | Song et al. |
| 2009/0319835 | A1 * | 12/2009 | Teranishi ............ 714/45 |

* cited by examiner

*Primary Examiner* — Camquy Truong

(57) ABSTRACT

A mixed workload scheduler and operating method efficiently handle diverse queries ranging from short less-intensive queries to long resource-intensive queries. A scheduler is configured for scheduling mixed workloads and comprises an analyzer and a schedule controller. The analyzer detects execution time and wait time of a plurality of queries and balances average stretch and maximum stretch of scheduled queries wherein query stretch is defined as a ratio of a sum of wait time and execution time to execution time of a query. The schedule controller modifies scheduling of queries according to service level differentiation.

11 Claims, 10 Drawing Sheets

SYSTEM AND METHOD FOR MODIFYING SCHEDULING OF QUERIES IN RESPONSE TO THE BALANCING AVERAGE STRETCH AND MAXIMUM STRETCH OF SCHEDULED QUERIES

BACKGROUND

Many organizations create and deploy systems such as Enterprise Data Warehouses (EDW) to serve as the single source of corporate data for business intelligence (BI). EDWs expected to scale to enormous data volumes (hundreds of terabytes) and also expected to perform well under increasingly mixed and complex workloads, including batch and incremental data loads, batch reports, and complex ad hoc queries. One challenge for a system such as EDW is management of complex workloads to meet stringent performance objectives. For instance, batch load tasks are required to finish within a specified time window before reports or queries can be serviced. Batch reports may issue thousands of "roll up" (aggregation) queries that are required to complete within a specified time window. Ad hoc queries may have user-specified deadlines, priorities, and the like. Workload management addresses the problem of scheduling, admitting, and executing queries, and allocating resources to meet the performance objectives.

SUMMARY

Embodiments of a mixed workload scheduler and operating method efficiently handle diverse queries ranging from short less-intensive queries to long resource-intensive queries. A scheduler is configured for scheduling mixed workloads and comprises an analyzer and a schedule controller. The analyzer detects execution time and wait time of a plurality of queries and balances average stretch and maximum stretch of scheduled queries wherein query stretch is defined as a ratio of a sum of wait time and execution time to execution time of a query. The schedule controller modifies scheduling of queries according to service level differentiation.

BRIEF DESCRIPTION OF THE DRAWINGS

Embodiments of the invention relating to both structure and method of operation may best be understood by referring to the following description and accompanying drawings.

DETAILED DESCRIPTION

Embodiments of systems and methods enable a mixed workload scheduler in various arrangements and for various applications. One example application is usage with Enterprise data.

In an example application, a typical online Business Intelligence (BI) workload can include a combination of short less-intensive queries, along with long resource-intensive queries. The longest queries in a typical BI workload may take several orders of magnitude more time to execute in comparison to the shortest queries in the workload. Design criteria for a good Mixed Workload Scheduler (MWS) include fairness, effectiveness, efficiency, and differentiation character.

Figure 1:
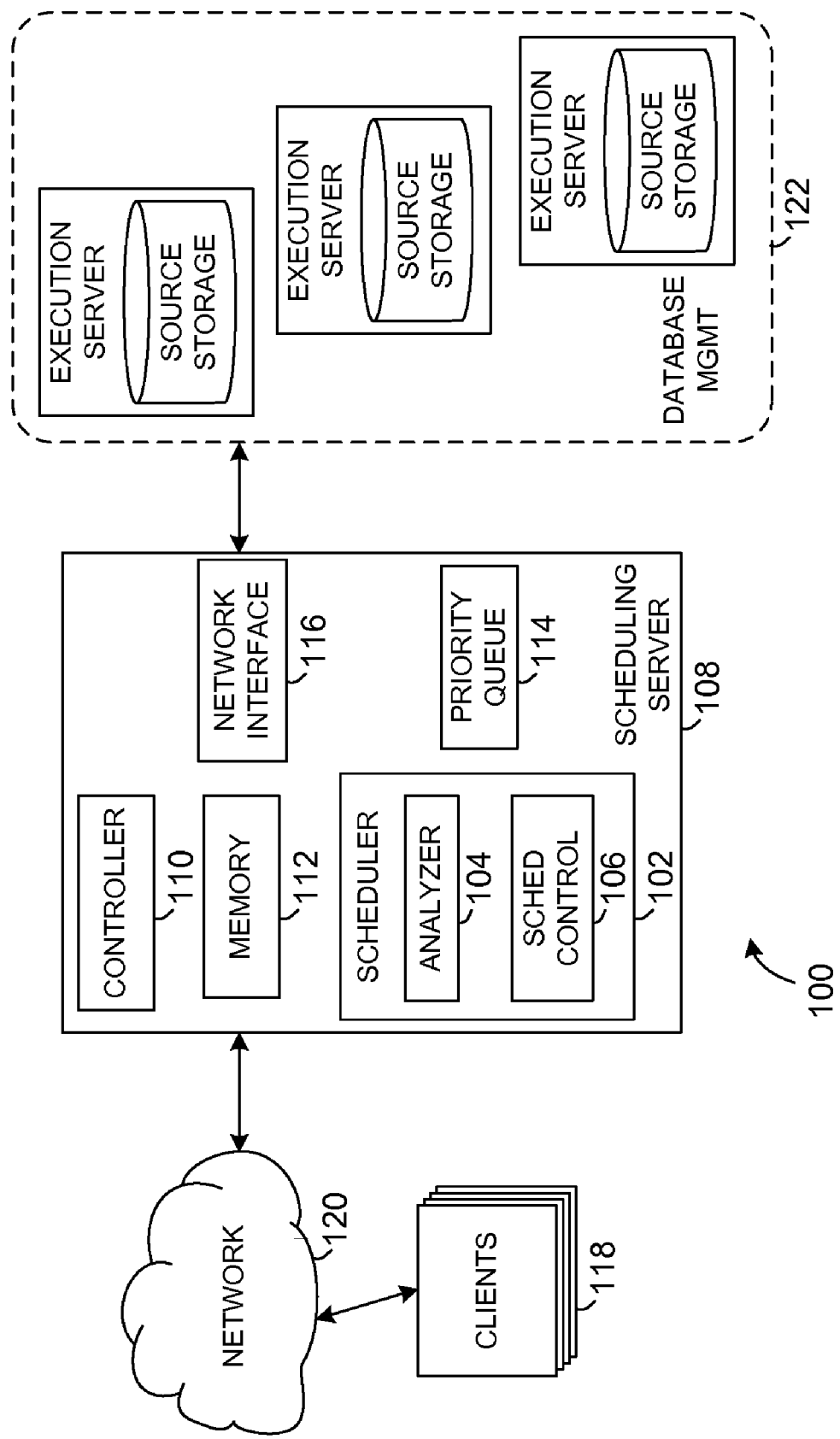
FIG. 1 is a schematic block diagram depicting an embodiment of a workload management system including a mixed workload scheduler that efficiently handles diverse queries ranging from short less-intensive queries to long resource-intensive queries.

Referring to FIG. 1, a schematic block diagram illustrates an embodiment of a workload management system 100 including a mixed workload scheduler 102 that efficiently handles diverse queries ranging from short less-intensive queries to long resource-intensive queries. The illustrative workload management system 100 comprises a scheduler 102 configured for scheduling mixed workloads. The scheduler 102 further comprises an analyzer 104 and a schedule controller 106. The analyzer 104 detects execution time and wait time of a plurality of queries and balances average stretch and maximum stretch of scheduled queries wherein query stretch is defined as a ratio of a sum of wait time and execution time to execution time of a query. The schedule controller 106 modifies scheduling of queries according to service level differentiation.

The workload management system 100 can further comprise a scheduling server 108 which includes a controller 110 configured to execute the scheduler 102, a memory 112 coupled to the controller 110 with a priority queue 114 that holds the scheduled queries, and a network interface 116 coupled to the controller 110 that interfaces the scheduling server 108 to a plurality of clients 118 via a network 120.

In an illustrative embodiment, the scheduling server 108 can be configured for scheduling queries for execution by a database management system 122. The scheduling server 108 can comprise the priority queue 114 and the scheduler 102. The priority queue 114 queues the plurality of queries for execution by the database management system 122. In the example implementation, the scheduler 102 can maintain the priority queue 114 as a single queue of queries for selection for execution by the database management system 122 and assigns a rank to the query entries on the queue. The scheduler 102 orders the query entries on the queue according to the rank and selects a query of highest rank for execution in the database management system 122.

In various implementations and/or conditions, the scheduler 102 can assign rank in various ways. For example, the scheduler 102 can assign higher rank to query entries on the queue in order of lesser execution time. The scheduler 102 can also assign higher rank to query entries on the queue in order of higher current wait time for query entries on the queue with like execution time. The scheduler 102 can further assign higher rank to query entries on the queue in order of lesser execution time, adding an increment to the assigned rank in proportion to current wait time.

If the scheduler 102 assigns rank based on order of lesser execution time and adds the increment in proportion to current wait time, the scheduler 102 can add the increment to the assigned rank in proportion to current wait time wherein a proportional constant is less than an inverse of the square of a largest query size.

In various implementations and/or conditions, the scheduler 102 can differentiate query rank according to other aspects of operation. For example, the scheduler 102 can differentiate rank of queries according to quality of service (QoS) comprising multiplying inverse of query execution time by normalized query service level.

The query rank can be linear in time and change at a same rate for all queries in the queue.

Figure 2:
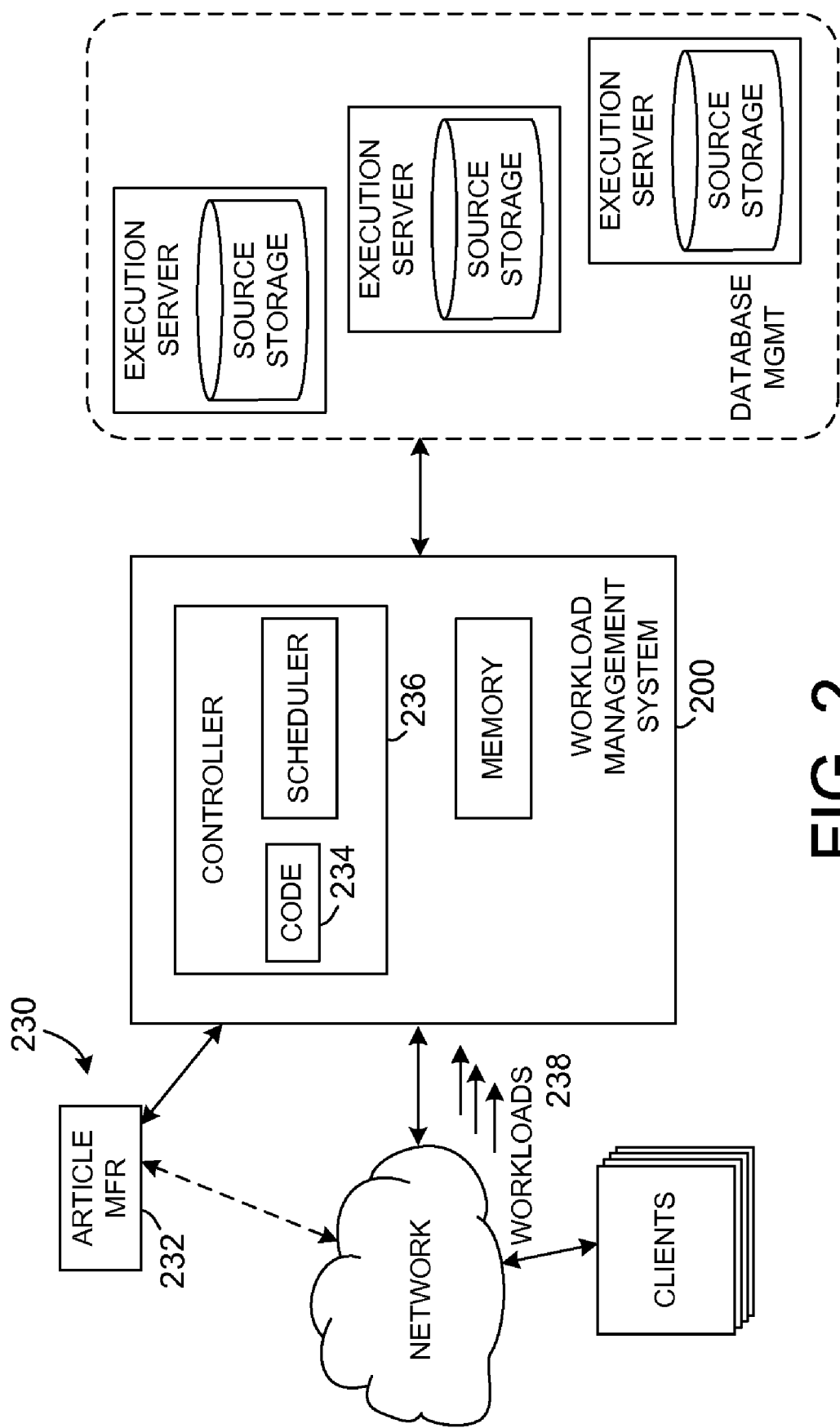
FIG. 2 is a schematic block diagram showing an embodiment of an article of manufacture that implements a workload management system including a mixed workload scheduler that efficiently handles diverse queries ranging from short less-intensive queries to long resource-intensive queries.

Referring to FIG. 2, a schematic block diagram depicts an embodiment of an article of manufacture 230 that implements a workload management system 200 including a mixed workload scheduler that efficiently handles diverse queries ranging from short less-intensive queries to long resource-intensive queries. The article of manufacture 230 comprises a controller-usable medium 232 having a computer readable program code 234 embodied in a controller 236 for scheduling mixed workloads 238. The computer readable program code 234 further comprises code causing the controller 236 to balance average stretch and maximum stretch of scheduled queries, and code causing the controller 236 to modify scheduling of queries according to service level differentiation.

Figure 3A:
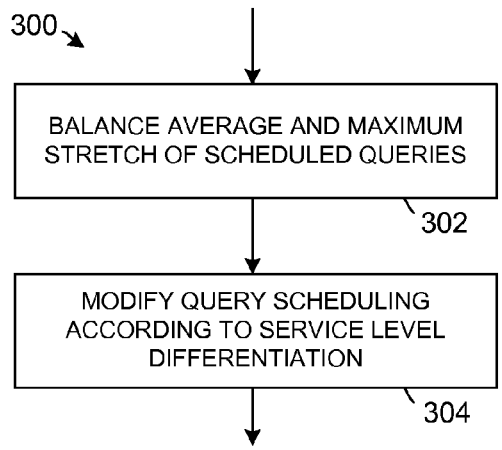
FIGS. 3A through 3E are flow charts illustrating one or more embodiments or aspects of a computer-executed method for scheduling mixed workloads.

Referring to FIGS. 3A through 3E, flow charts illustrate one or more embodiments or aspects of a computer-executed method for scheduling mixed workloads. As shown in FIG. 3A, the method 300 comprises balancing 302 average stretch and maximum stretch of scheduled queries wherein query stretch is defined as a ratio of a sum of wait time and execution time to execution time of a query, and modifying 304 scheduling of queries according to service level differentiation.

Figure 3B:
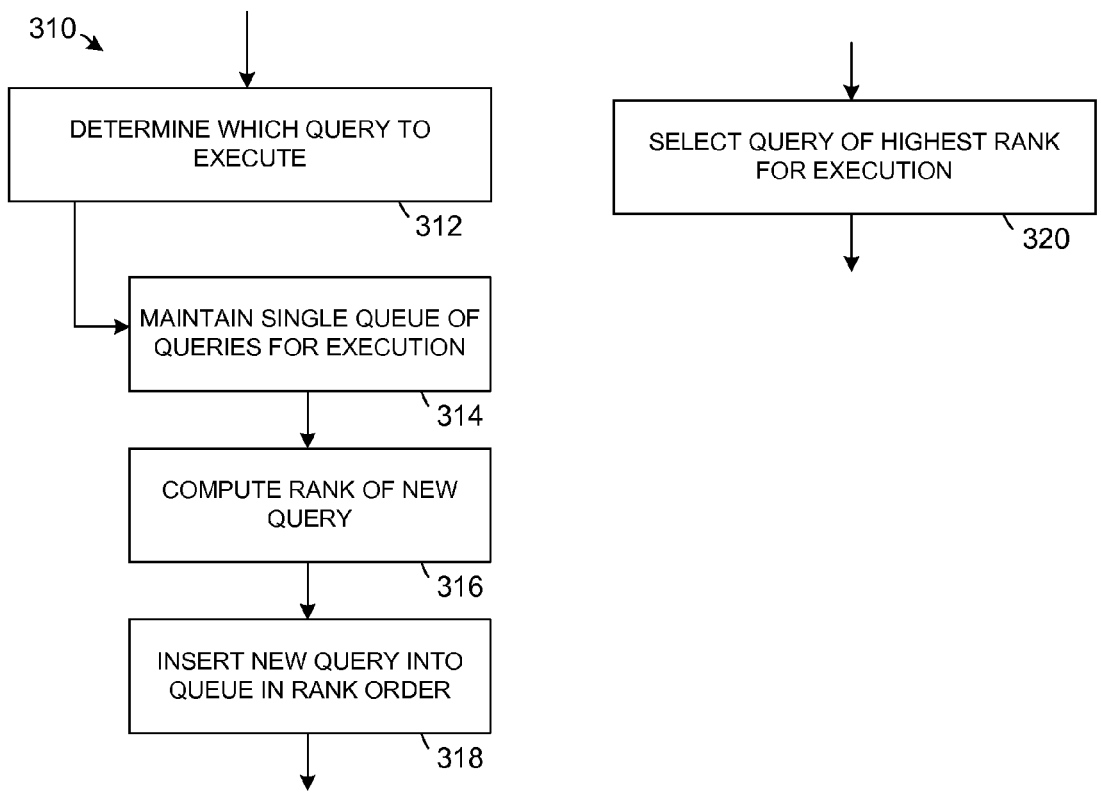

Referring to FIG. 3B, an embodiment of a mixed workload scheduling method 310 can include the action of determining 312 which query of a plurality of queries is to be executed by a database management system by maintaining 314 a single queue of queries for selection for execution by the database management system, and assigning 316 a rank to the query entries on the queue. The query entries on the queue are ordered 318 according to the rank. Running independently of or parallel with determining 312 which query is to be executed, a query of highest rank is selected 320 for execution in the database management system.

Figure 3C:
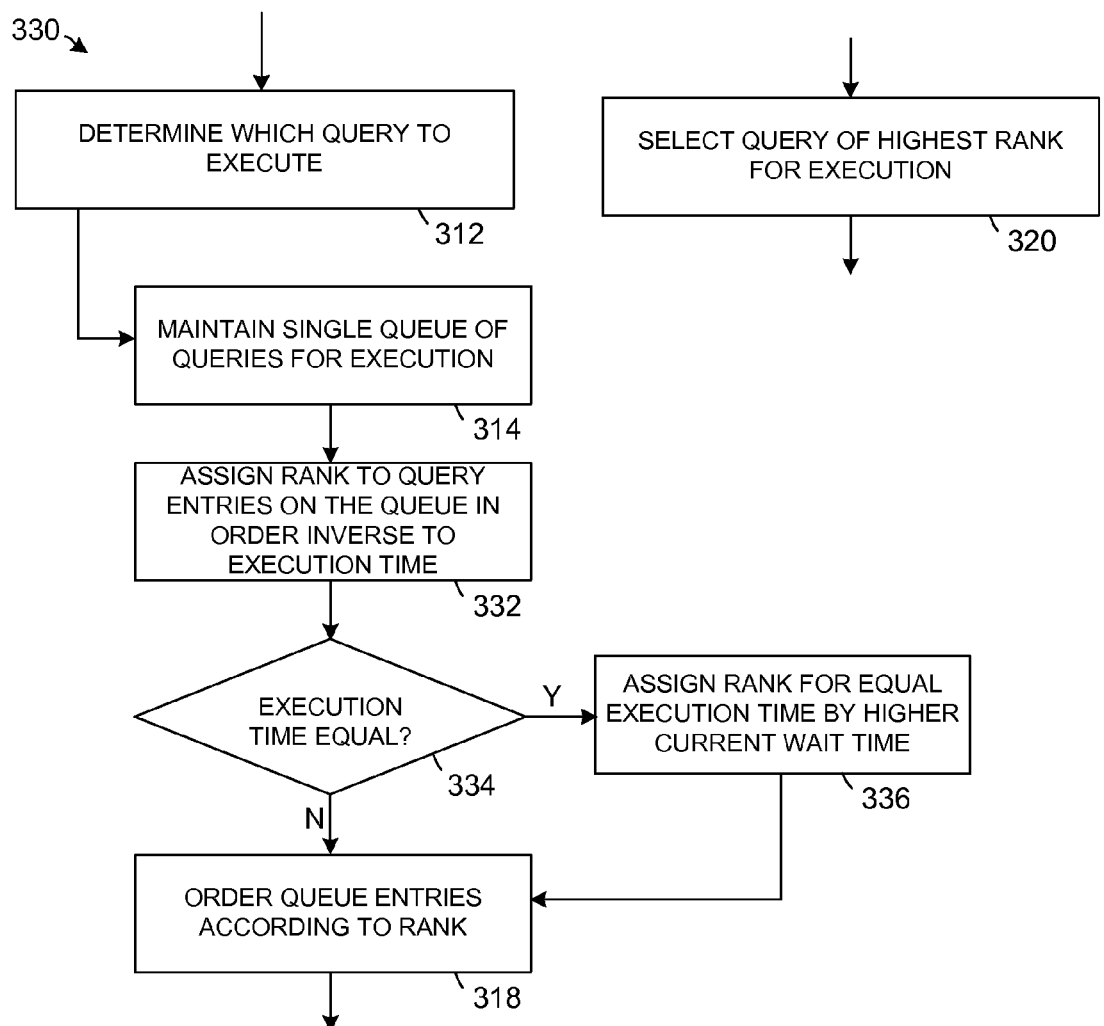

Referring to FIG. 3C, an embodiment of a mixed workload scheduling method 330 can assign 332 higher rank to query entries on the queue in order of lesser execution time. If query entries on the queue have the same execution time 334, a higher rank can be assigned 336 to query entries on the queue in order of higher current wait time.

Figure 3D:
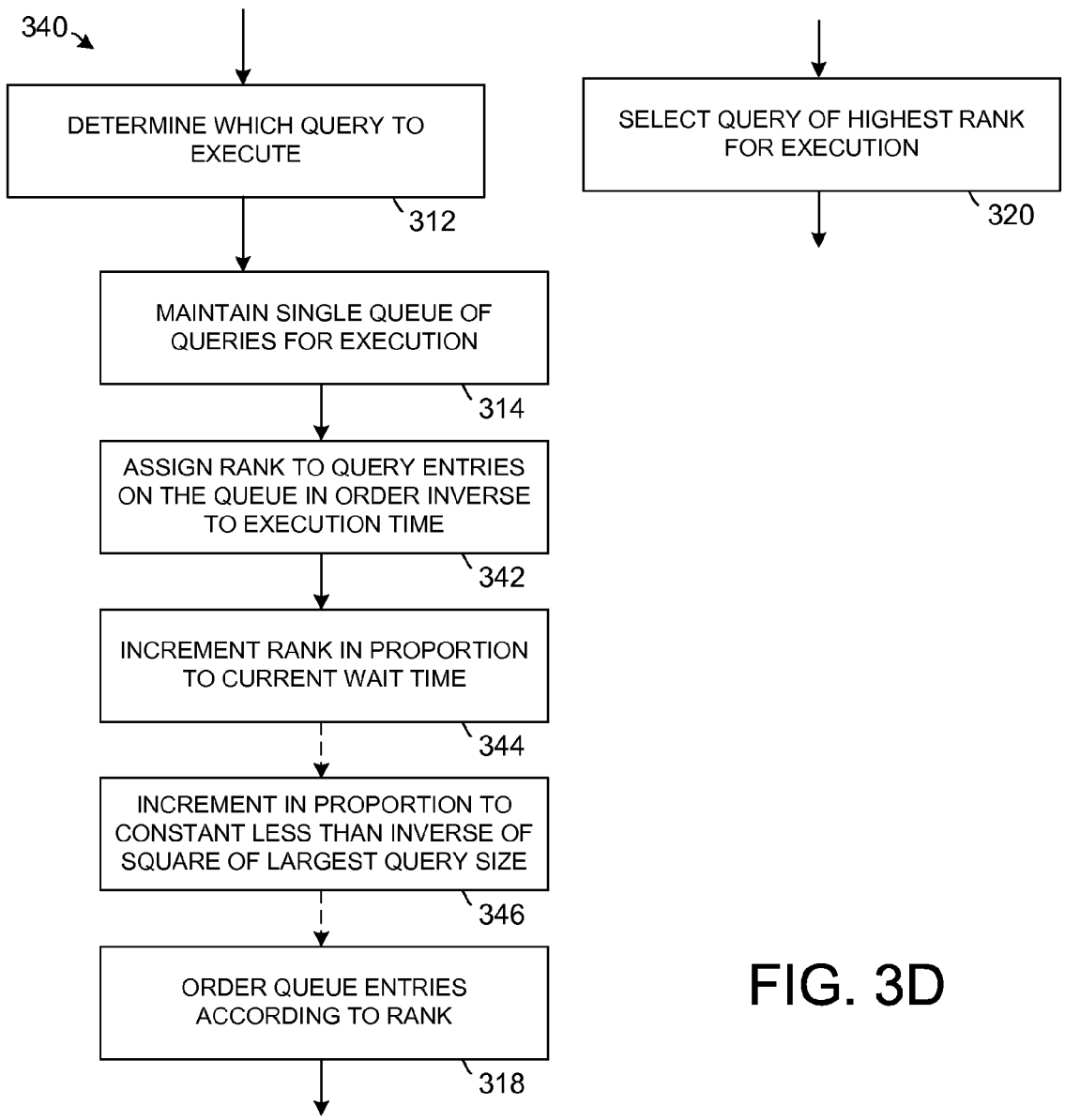

Referring to FIG. 3D, an embodiment of a mixed workload scheduling method 340 can assign 342 higher rank to query entries on the queue in order of lesser execution time and add 344 an increment to the assigned rank in proportion to current wait time. In an example implementation, the increment can be added 346 to the assigned rank in proportion to current wait time wherein a proportional constant is less than an inverse of the square of a largest query size.

Figure 3E:
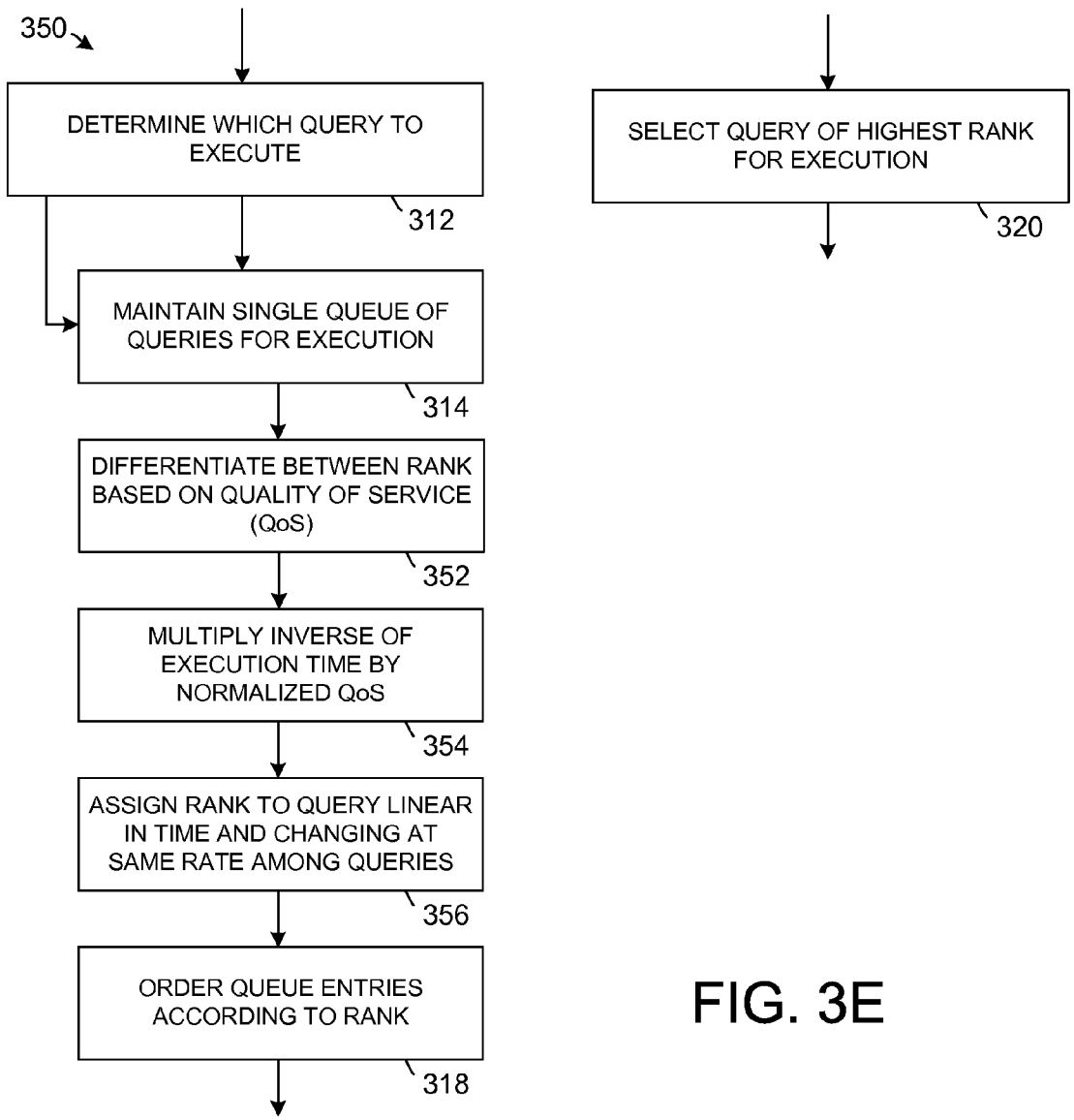

Referring to FIG. 3E, an embodiment of a mixed workload scheduling method 350 can further comprise differentiating 352 rank of queries according to quality of service (QoS) by multiplying 354 the inverse of query execution time by normalized query service level. In some implementations, query rank can be assigned 356 linear in time and changing at a same rate for all queries in the queue.

Figure 4:
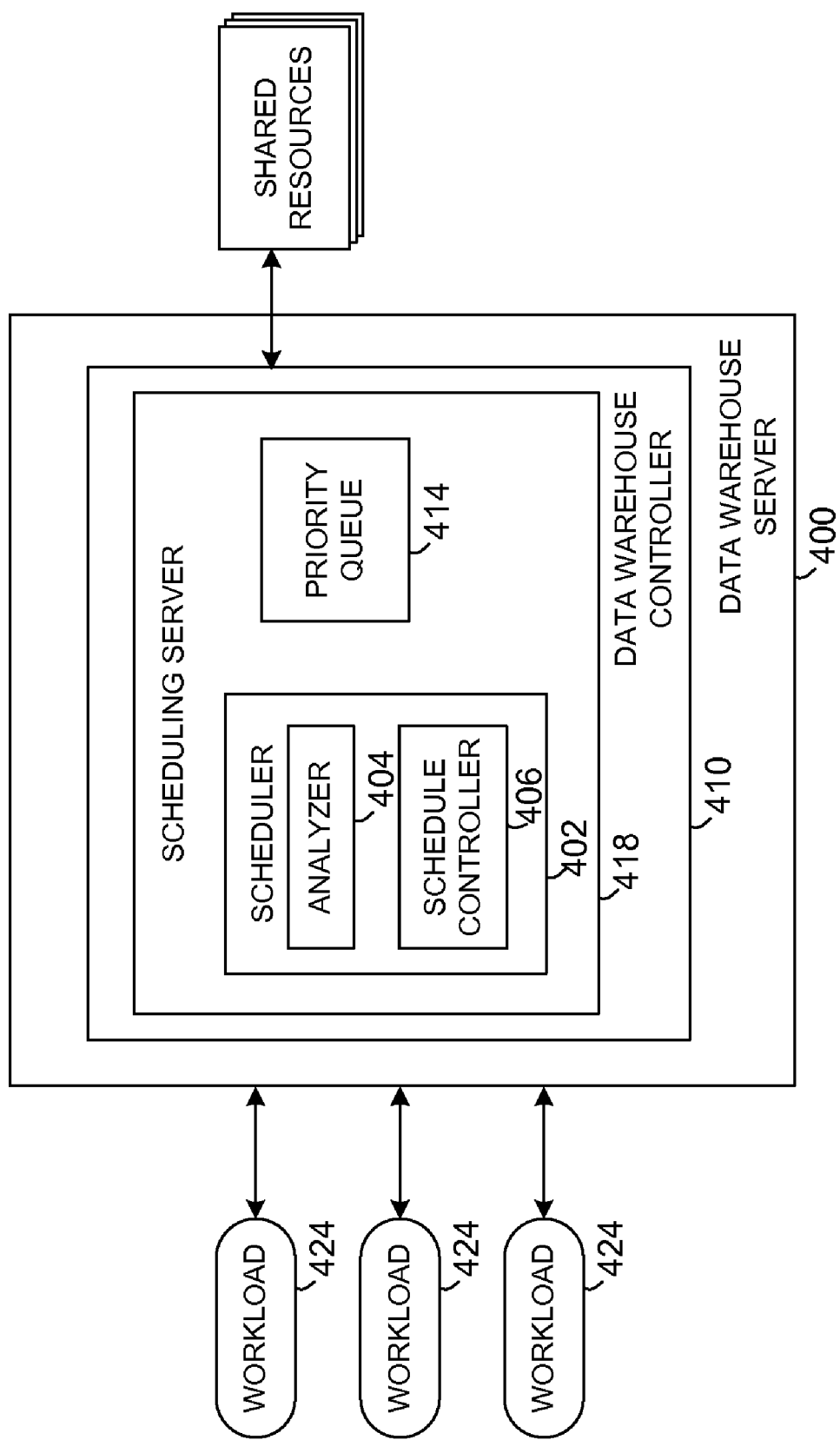
FIG. 4 is a schematic block diagram showing an embodiment of a data warehouse server.

Referring to FIG. 4, a schematic block diagram illustrates an embodiment of a data warehouse server 400. The example data warehouse server 400 comprises a data warehouse controller 410, one or more workloads 424 communicatively coupled to the data warehouse controller 410, and a scheduler 402. The scheduler 402 is coupled to the data warehouse controller 410 and configured for scheduling mixed workloads 424. The scheduler 424 comprises an analyzer 404 and a schedule controller 406. The analyzer 404 detects execution time and wait time of a plurality of queries and balances average stretch and maximum stretch of scheduled queries. Query stretch is defined as the ratio of a sum of wait time and execution time to execution time of a query. The schedule controller 406 modifies scheduling of queries according to service level differentiation.

In an example implementation, the data warehouse server 400 can further comprise a scheduling server 408 configured for scheduling queries for execution by data warehouse controller 410. The scheduling server 408 comprises a priority queue 414 and the scheduler 402. The priority queue 414 queues the plurality of queries for execution by the data warehouse controller 410. The scheduler 402 can maintain the priority queue 414 as a single queue of queries for selection for execution by the data warehouse controller 410 and assigns a rank to the query entries on the queue. The scheduler 402 orders the query entries on the queue according to the rank and selects a query of highest rank for execution in the data warehouse controller 410.

Figure 5:
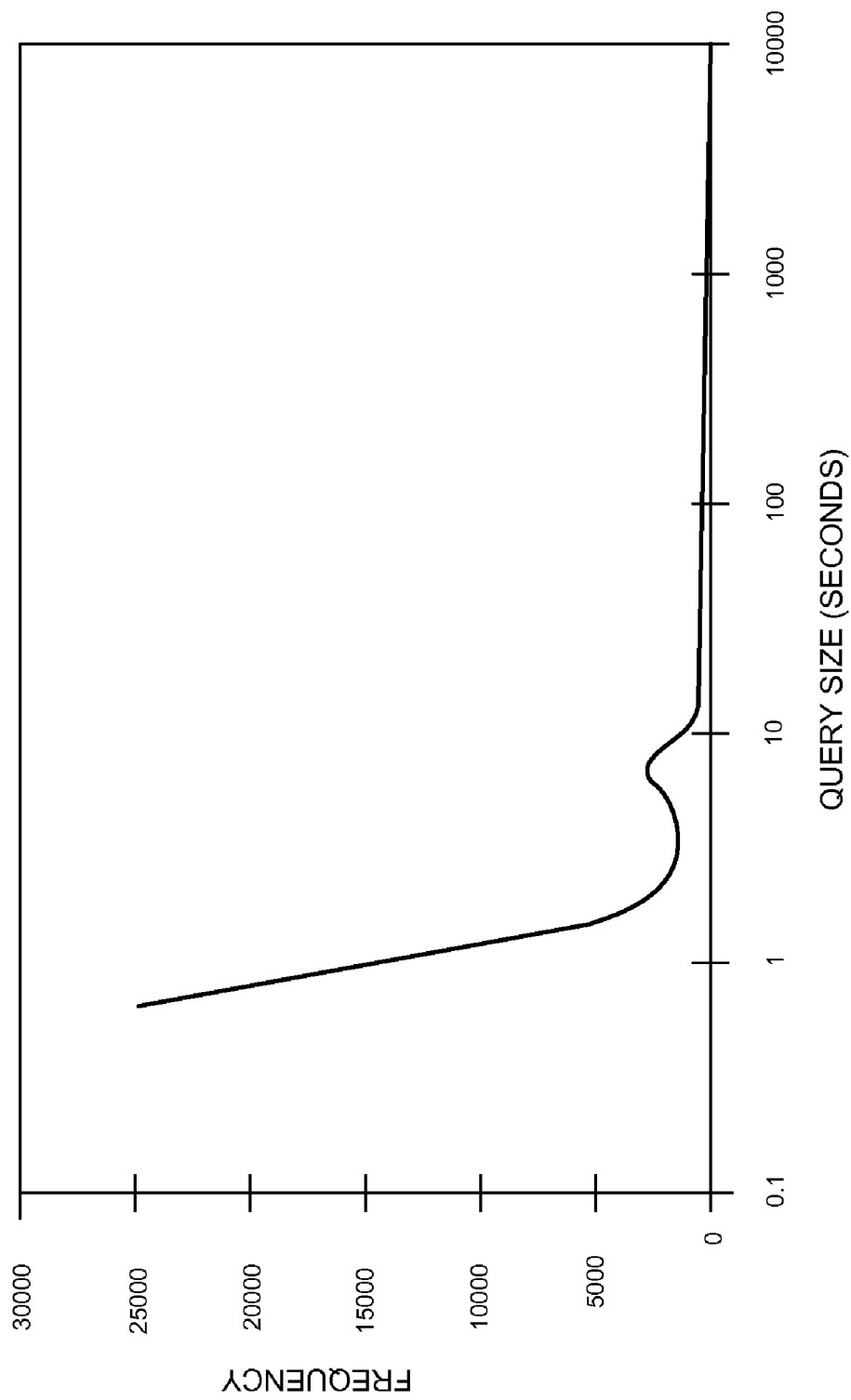
FIG. 5 is a graph depicting an example of a distribution of business intelligence query sizes.

The mixed workload scheduler can be implemented in an Enterprise Data Warehouse (EDW) application. The mixed workload scheduler is configured to handle Business Intelligence (BI) workload characteristics. A typical distribution of BI query sizes is shown in FIG. 5 which estimates a one-day compilation of queries (about 50,000) from an actual large EDW. The query sizes, expressed as execution times, are combined in bins on the x-axis and the frequency of each bin is plotted on the y-axis. In the distribution, the majority of the queries are small in size, this having a short run-time. A small number of queries have a very large in size. The largest query is over 10,000 times larger than the smallest query, forming a classic heavy-tailed distribution.

Figure 6:
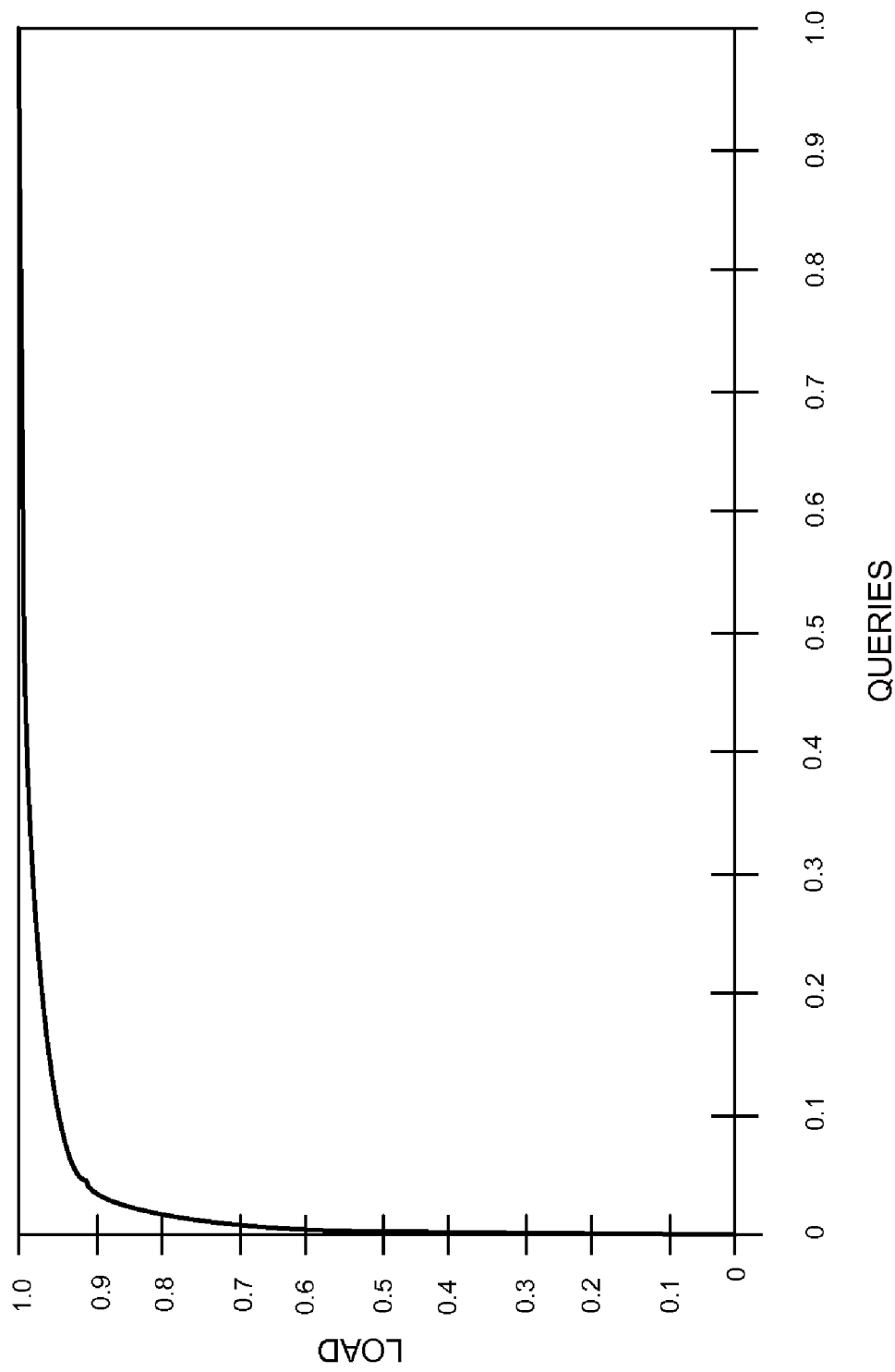
FIG. 6 is a graph illustrating an example workload distribution across queries.

A typical BI workload can be analyzed by means of the Pareto principle or the 90-10 rule. Assuming the execution time of a query is an approximation of the amount of load that the query imposes on the system, then 10% of the largest queries make up approximately 90% of the load on the system as shown in FIG. 6, a graph illustrating workload distribution across queries. In FIG. 6, the x-axis represents queries arranged in descending order of size and the y-axis represents the cumulative load placed on the system. To compute the load placed on a system by a single query, query execution time in seconds is divided by the sum of the execution times of all the queries in the workload, also in seconds. The workload can be defined based on all queries that run in a specific twenty-four hour period.

The two query distribution characteristics of BI workloads have sharp contrast to traditional on-line transaction processing (OLTP) systems which have formed basis for traditional analysis of query scheduling in which most transactions have similar sizes and the load is uniformly distributed across the queries. Accordingly, the complex BI workloads impose a particular challenge to design of an effective mixed workload scheduler (MWS).

Desired properties of a mixed workload scheduler (MWS) can include fairness, effectiveness, efficiency, and differentiation characters, the combination of which clearly define what "good" means in the context of a MWS. Good performance can mean that the workload scheduler is fair in that no query starves for resources. Good performance can also mean that the workload scheduler is effective and thus reduces the average execution time of all queries. Good performance can also mean that the workload scheduler is efficient and does not place a large overhead on the system to run. Finally, good performance can mean that the workload scheduler is differentiated and is thus service-level aware and can enable different levels of service to different queries. The performance characteristics can be called a FEED criteria for Fair, Effective, Efficient, and Differentiated.

Supporting different service levels for different types of queries is a property of a good MWS. A higher service level means that queries assigned to that level experience better average performance characteristics compared with queries assigned to lower service levels. Typically, batch queries have lower service level objectives than interactive queries. Additionally, the service level objectives for an interactive query may depend on a user's role and position in an enterprise or organization.

The four different FEED criteria are all pertinent to good MWS performance. The four criteria are often contradictory to one other. For example a fair system can be implemented by executing in a first-in-first-out (FIFO) mode, but would not be effective because a short query stuck behind a long one might have to wait an extended time. Similarly, an effective system design attained by executing queries in a shortest-job-first (SJF) scheme might cause some large queries to starve and never be executed. Similarly, a differentiated system design attained by always giving a higher preference to the queries that belong to a higher service level might be neither fair, nor effective. The MWS system disclosed herein systematically balances tradeoffs between the different criteria, and enable good MWS performance for heavy-tailed BI workloads.

The aspect of "stretch" is another differentiator between query scheduling in OLTP systems and performance in BI systems, and can be used as a perspective for evaluation. In OLTP systems, a highly pertinent metric for evaluating performance is average response time or, equivalently, the flow of a set of transactions, often reported as a throughput number (queries per hour). Most OLTP transactions are mutually similar so an aggregate measure representing the system perspective of performance is sufficient.

In contrast to OLTP implementations, in BI systems the user perspective, not the system perspective, is most pertinent. End users and Database Administrators (DBAs) typically describe the most pertinent metric for system evaluation from the user perspective is stretch rather than throughput. Stretch for a query i is defined as $S_i=(c_i-a_i)/p_i$, where $c_i$ is the end time, $a_i$ is the arrival time, and $p_i$ is the execution time of a query. Within a service level, the stretch parameter captures the idea of fairness from a user perspective. A user with a small query expects a quick response, whereas if the query is large the user might be willing to wait proportionally longer to receive results.

Figure 7:
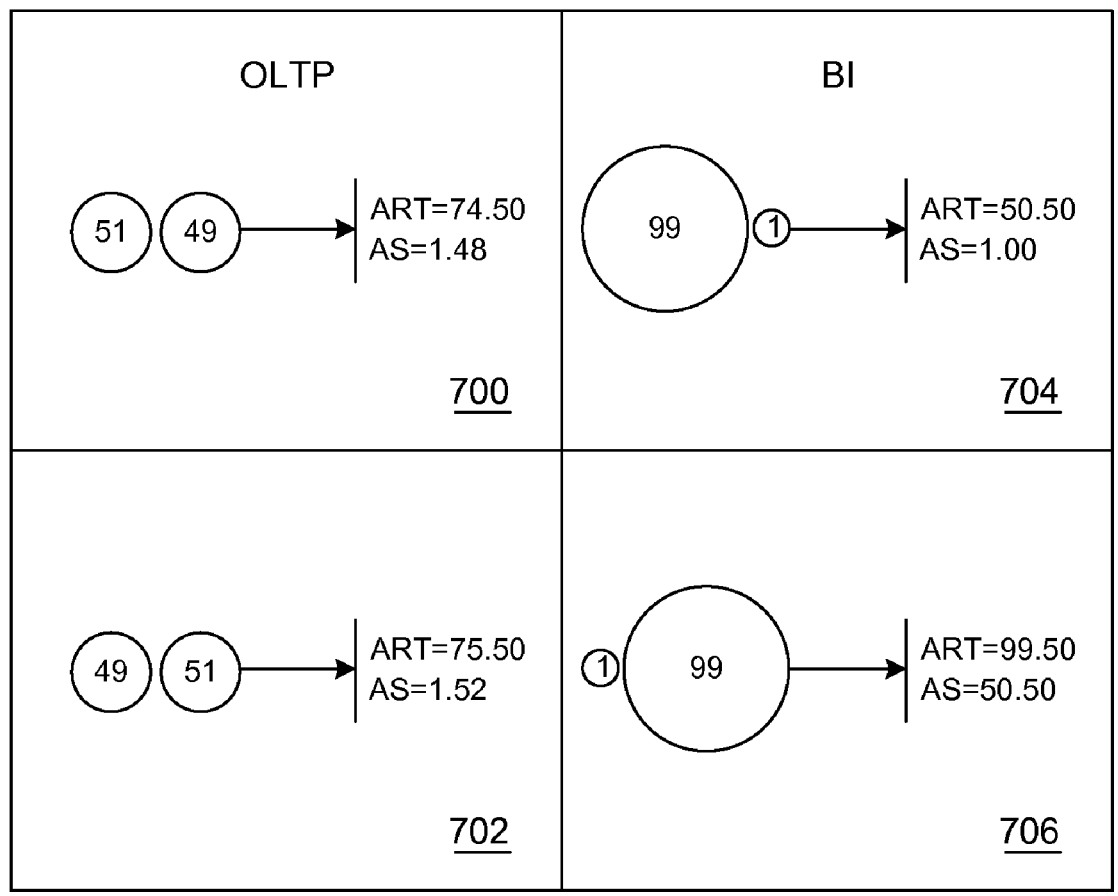
FIG. 7 is a diagram showing average response time and average stretch of different workloads.

If a large variation exists in the execution time of queries as in the case with BI workloads, the order of execution may not have a large effect on the average response time of the queries, but may have a big impact on the average stretch of the queries. FIG. 7 is a diagram showing average response time and average stretch of different workloads and assists in illustrating of the effect of execution order on response time and stretch. The illustrative example assumes a single queue and a single threaded server. The OLTP workload has two queries of size 49 and 51. If the shorter query enters first as in case 700, the average response time (ART) is 74.50 and the Average Stretch (AS) is 1.48. If the longer query enters first as in case 702, the ART is 75.50 and the AS is 1.52. Since both queries are approximately the same size, the order has only a small effect on both the ART and the AS.

The BI workload has two queries of size 1 and 99. If the short query enters first as shown in case 704, the ART for the workload is 50.50. If the long query enters first as shown in case 706, the ART roughly doubles to 99.5. Performance shows a contrast to the increase in stretch which is much more pronounced. If the short query enters first as in case 704, the average stretch is approximately 1. However, if the long query enters first as depicted in case 706, the average stretch is 50.50. Thus, although the reordering of queries causes only a factor of two increase in average response time in the system perspective, reordering results in a fifty-fold increase in the average stretch in the user perspective.

Most past analysis has focused on average response time or throughput, which measures the system performance from the system perspective. In contrast, the system and techniques disclosed herein stress the user perspective in terms of the stretch metric, which is extremely relevant in BI systems, in which query distributions are heavy-tailed and the ratio between the long queries and the short queries is very large.

Business Intelligence workloads can be highly variable. A challenge with the past and current mixed workload schedulers is a requirement for a significant amount of manual input and tuning, which in turn depends on the expected mix of the workload. The challenge is particularly pertinent in typical BI environments because the mix of the workload can vary widely and can change continuously. The dynamically changing nature of the workload mix results in highly difficult, if not impossible, manual handling to tune the mixed workload scheduler.

The systems and techniques disclosed herein can address the described challenges in a mixed workload scheduler (MWS) which can be called rFEED to designate characteristics of fairness, effectiveness, efficiency, and differentiated character. rFEED is parameterized and involves computation of the various parameters for practical BI workloads, enabling running without any tuning or manual intervention. Workloads can be simulated and compared between the rFEED MWS with models of existing commercial systems. Experiments are included showing rFEED MWS performance in comparison to the existing model performance. In conclusion, in terms of the average stretch of queries, rFEED performs up to 120 times better than the analyzed current models. Aspects of rFEED design and implementation include (1) identification of design criteria for a good Mixed Workload Scheduler (MWS); (2) design of a MWS based on the criteria and computation of various parameters to implement the design for complex, mixed BI workloads (3) modeling of previously existing workload schedulers and comparison with rFEED; and (4) showing rFEED performs well without any manual tuning, even in conditions of dynamically changing, mixed workloads.

In an academic setting, the objective of scheduling seeks hard bounds for a metric of interest, for example minimizing the average value of stretch. If precise bounds are difficult to set, approximation results are sought with worst case guarantees. In industrial settings, DBMSs aim towards a more hands-on approach where the user specifies various parameters based on experience.

Academic scheduling analysis is typically based on online scheduling wherein query properties are not known in advance. Scheduling is also analyzed as preemptive and non-preemptive. A non-preemptive (NP) approach to scheduling is common since preempt very small queries that make the bulk of a BI workload can be expensive.

Scheduling techniques can focus on minimizing a selected metric, for example stretch, as a measure of goodness. Metrics related to stretch are flow which measures the amount of time an item spends in the system, and weighted flow where the flow is weighted with some quantity. Stretch, can be considered a special case for weighted flow where flow is weighted with processing time. For both the metrics, minimization of the average and the maximum value can be analyzed.

Shortest-job-first (SJF) handling is known to minimize the average value for flow and a first-in-first-out (FIFO) technique minimizes the maximum value for flow. The weighted case of flow is known to be NP-hard even on a single machine.

The stretch metric is most pertinent to the systems and techniques disclosed herein. No online algorithm is found to approximate the maximum stretch to within a factor of O $(n^{0.5-\epsilon})$ unless P=NP for the non-preemptive case. Furthermore, such online algorithms may require knowledge of the actual value of maximum stretch and may not be sub-linear in complexity.

The systems and techniques disclosed herein differ from prior known methods in two significant ways. First, the average or the maximum stretch are not simply minimized, but rather are balanced. Accordingly, the average stretch is not merely minimized but rather the maximum value of stretch is also controlled. Second, the illustrative systems and techniques address different service levels.

In the industrial setting, scheduling has traditionally been studied extensively in various scenarios from job shop scheduling to operating systems. Various heuristics such as most-requests-first, first-come-first-served, and longest-wait-first have been considered in wireless context and in the context of CDMA. The approach and results disclosed herein are different, since stretch is analyzed in the context of DBMS towards meeting the FEED specifications.

In the database scenario, the disclosed systems and techniques can be implemented to address stretch in the context of the non-preemptive case.

The scheduling function in the disclosed systems and methods uses a composite function of processing time and wait time of the queries to be scheduled. The technique can be used in the context of web scheduling, which can be called alpha-scheduling. The systems and methods disclosed herein address the stretch of a query, introduce different service levels, and suggest specific values for the constants in a rank function.

In the industrial DBMS context, workload schedulers can require a user or an administrator to specify a number of parameters such as the number of large queries that can be run, the maximum number of queries per user, and the like. In a mixed workload setting, the manual setting of such parameters is used to mitigate the adverse impact of large queries on the smaller queries. In another example, a workload scheduler can require manual intervention for specifying particular time shares for different users based on service levels and operating conditions.

The disclosed systems and techniques can incorporate methods for online scheduling, beginning with a scheduling function and modifying the functional form to suit the industrial setting to meet the various conditions of a good mixed workload scheduler.

The mixed workload scheduling systems and techniques disclosed herein analyze stretch in the context of a system that is both fair and effective while at the same time enabling differentiated service to different service levels, performing these aspects while eliminating the need for manual intervention by data base administrator or user.

The mixed workload scheduler disclosed herein uses stretch as the metric of choice for the scheduling approach. The scheduling approach is based on aspects of stretch and size that are precisely defined as follows.

The stretch of a query j at time t is defined as $S_j=(t-a_j)/p_j$. When $t=c_j$, the final stretch for the query j is $S_j=(c_j-a_j)/p_j=(w_j+p_j)/p_j$, where t is the current time, $c_j$ is the completion time, $a_j$ is the arrival time, $p_j$ is the execution time, and $w_j$ is the wait time of the query j.

The concept of stretch addresses fairness from a user's perspective. A user of a short query expects a short response time and a user of a large query expects a large response time.

The concept of minimizing the stretch of a query as discussed herein relates to minimizing the final stretch. Accordingly, the term stretch is used hereinafter to relate to final stretch unless otherwise clear from the context.

The term size of query q is defined as the processing time $p_q$ of the query.

The various system and method embodiments disclosed herein can include a mixed workload scheduler (MWS) that follows the FEED properties comprising fairness, effectiveness, efficiency, and differentiated character. The term fair is defined according to stretch. In an unfair system, queries in a query stream have very different values for stretch wherein some queries can have a very small value for stretch and other queries can have a very large value for stretch. A more fair database management system (DBMS) is attained when the mixed workload scheduler (MWS) minimizes the maximum value of stretch for the queries in the system.

Effectiveness for a system is also defined based on stretch and can be measured by the average value for stretch. A DBMS can be made more effective when the MWS to minimize the average stretch for queries in the system.

Efficiency is defined based on computational and input/output load imposed. In an efficient online system the complexity of the scheduling algorithm should be low. Otherwise the algorithm may be too expensive to use under actual conditions. One technique for increasing MWS efficiency is to make the implementation sub-linear in complexity.

Differentiation is defined based on stretch and relative importance. For example, in a differentiated DBMS different query types and users, based on importance, needs, and the like, can be offered different performance in terms of the average value of stretch so that queries with higher service level requirement have a lesser stretch than a corresponding query with a lower service level requirement. One technique for creating a MWS that is differentiated is to incorporate service level requirements directly into the scheduling function.

The illustrative rFEED MWS design is intended to attain and balance FEED goals simultaneously, since the goals can be mutually contradictory.

The disclosed systems and techniques can include an external scheduling mechanism that determines which query is to be allowed entry into the DBMS. At all times, a single queue L of queries is maintained outside the DBMS. Every query q∈L is assigned a rank $R_q$. At the time of execution the query with the highest rank is admitted into the DBMS for execution. Rank is defined as the assignment of a query in order for admission into execution. $R_q$ is the rank assigned to a query q. At any time, the rFEED scheduling scheme first admits for execution the query q with the highest rank $R_q$ in the queue of queries L.

The disclosed systems and techniques maintain a single queue of queries ordered on the rank function. A system with multiple queues can lead to the local optimization of some metric (for example stretch or flow) for every queue. Therefore, global optimality would require consideration of all the queries in the various queues. Since, global optimality is the desired outcome; consideration of a single queue is most efficient.

In an example discussion, the minimum query size can be considered to be 1 without any loss of generality since the processing time of each query can be divided by the processing time of the smallest query. The term $\psi$ is used herein to designate the largest possible processing time of any query.

The rank function of a query q is denoted as $R_q$ and used to facilitate simultaneously achievement of the FEED goals.

Effectiveness can be considered as the first goal of a scheduling implementation. For an effective scheduling implementation, the total value for stretch for a set of queries is minimized, thereby in consequence minimizing the average value.

For two queries $q_1$ and $q_2$ with processing times $p_1$ and $p_2$ and wait times $w_1$ and $w_2$ respectively, query order is determined such that the total stretch is minimized. For the order of $q_1$ then $q_2$ the total stretch S is $(p_1+w_1)/p_1+(p_2+p_1+w_2)/p_2$ which can be expressed as $2+w_1/p_1+w_2/p_2+p_1/p_2$. In the latter expression, only the last quantity depends on the order so to minimize the above quantity, $p_1$ should be less than $p_2$, leading to a first rule. A higher rank is assigned to the query with the lesser execution time.

To assign the highest rank to the shortest query, the inverse of the processing time is determined and the rank becomes $R_q=1/p_q$ where $p_q$ is the processing time for a query q, an equation that simply expresses shortest-job-first (SJF) processing. SJF is known to be provably optimal for minimizing total flow.

The technique is further configured for fairness. The scheduling scheme is desired to be fair, meaning that a larger query, having waited for a predetermined time, should have a higher rank and thus an elevated precedence compared to a similar sized query that has recently arrived. Fairness is thus analyzed in the context of queries with the same processing time but different waiting times. Mathematically, fairness reduces to an attempt to minimize the maximum stretch for any query.

For a set of queries $q_1, q_2, \ldots, q_n$ with waiting times $w_1, w_2, \ldots, w_n$ and a processing time equal to 1 executed in the order $q_1, q_2, \ldots, q_n$, then the resulting stretches are $1+w_1, 2+w_2, \ldots, n+w_n$. To minimize the maximum value of stretch, the query with the highest wait $w_{max}$ is executed first since if kept waiting the highest stretch would become $w_{max}$ plus some positive quantity. The expression for rank is thus increased by waiting time. The higher the wait time, the higher the rank should be. The expression for rank thus becomes $R_q=1/p_q+Kw_q$ where $w_q$ is the waiting time for a query and K is a predetermined constant. For K>0, the longer the query waits, the higher the rank.

Hereinafter a technique is disclosed for assigning the value of K such that the competing goals of fairness and effectiveness are balanced.

With respect to the aspect of differentiation, differentiated service levels to queries are sought based on quality-of-service (QoS) requirement. The technique assigns a higher rank to a query with higher service levels. Suitable differentiation can be attained by multiplying the inverse of processing time in the rank expression by the service level requirement so that rank becomes $R_q=\Delta_q/p_q+Kw_q$ where $\Delta_q \geq 1$ is the normalized service level for a query q.

The number of distinct values of $\Delta_q$ is equal to the number of distinct service levels and every query belonging to the same service level has the same service level $\Delta_q$. For queries at the lowest service level, the value of $\Delta_q$ can be assigned 1 with higher service level queries assigned higher $\Delta_q$ values.

The expression for rank indicates that for two queries arriving at the same time and having the same processing time, the query with the higher $\Delta_q$ value has a higher rank. The effect of multiplying by the normalized service level is to shift the rank of queries of different service levels by $\Delta$.

For example, if two sets of queries have average processing times of 1 and 10 respectively and all arrive simultaneously and all have the same $\Delta_q$ value, then the smaller queries on average are executed first. If the smaller queries have $\Delta_q=1$ and larger queries have $\Delta_q=10$, then the two sets are executed interchangeably. If the smaller queries have $\Delta_q=1$ and larger queries have $\Delta_q=100$, the larger queries are executed first.

Normalized service level $\Delta_q$ does not have to be manually computed to correspond to the service level. Hereinafter, a technique for obtaining a value of $\Delta_q$ given a particular quality-of-service (QOS) requirement is described.

Considering the aspect of efficiency, in an online setting the scheduling algorithm should have sub-liner complexity. In the context of the disclosed mixed workload scheduler, the computational burden of sorting the queue of queries to obtain the highest rank query every time a new query is to be executed is prohibitive. For example, on a normal day an example EDW can receive more than 67000 queries. Such a large number of queries can easily result in a very long waiting queue.

To avoid such sorting, a priority queue can be used. If implemented as a heap, a priority queue has O(log n) complexity for both insertion and updating of the queue.

In the illustrative rFEED implementation, rank function is used to insert queries into the priority queue. Every time a new query q enters, the new query is inserted in the order of rank $R_q$. To insert a query in order, for the new query q rank $R_q$ is computed along with queries with which query q is compared during insertion. For a new query the waiting time is zero, such that $t=a_q$. Then, $R_q=\Delta_q/p_q$ and for the existing queries, the rank of each query can be computed as $R_q=\Delta_q/p_q+Kw_q$ where w is the waiting time for that query.

Typically, in a priority queue the priority of an inserted element does not change after insertion. In the case of the disclosed system and method, since rank is function of time the rank of every query changes with time.

However, since rank is linear in time and changes at the same rate K for all the queries, the relative order of queries does not change. Accordingly, a query a ahead of query b at the time of insertion continues to remain ahead. Similarly, a query a behind query b at the time of insertion continues to remain behind. Thus, the queue maintains the order of queries once the queries are inserted.

Thus, as time progresses only those queries with which the query to be inserted is to be compared are updated in rank, without having to update the rank of every query. As with priority queues in general, the illustrative technique gives us O(log n) complexity.

Rank function is considered in terms of both processing time and wait time in a single equation so that while the smaller queries are executed quickly, the larger queries do not have to wait infinitely to be executed. Thus minimization of the average value for stretch does not lead to a large increase in the maximum value of stretch. For an efficient rFEED implementation, the fact that the rank equation is linear in wait time has beneficial properties, in that the equation can be converted to a sub-linear algorithm using priority queues. In addition, multiplying the rank function with $\Delta_q$ has the effect of giving a higher rank to queries from higher service levels.

Another aspect of the illustrative MWS technique is computation of the constant K. Based on the value of constant K, the rank function generalizes aspects of the scheduling functions. If K=0, then the algorithm becomes shortest-job-first (SJF). A non-zero constant K ensures that ranks of the larger queries increases and at some point the ranks start becoming greater than new smaller queries. For values of K greater than some constant, the algorithm becomes first-in-first-out (FIFO) so that queries are scheduled without regard for the processing time.

For analysis purposes, the shortest possible waiting time and smallest query size is 1 and the size of the largest query is $\psi$. For simplicity of illustration, all queries can be assumed to have the same normalized service level.

The scheme behaves as a FIFO scheme if the largest query with waiting time of 1 has a higher rank than a newly arrived smallest query. If so, using the equation for rank, $R_q=\Delta_q/p_q+Kw_q=1/\psi+K>1$, so that $K>1-1/\psi$. Thus, for all values of $K>1-1/\psi$, the illustrative scheme behaves as a FIFO queue.

SJF is considered optimal for minimizing the total flow while FIFO minimizes the maximum flow. Otherwise stated, K=0 enables an effective algorithm and K=1−1 results in a fair scheme. For a value of K such that 0<K<1−1, the resulting scheme is fair and effective.

Computation of constant K is selected to attain fairness and effectiveness in the context of stretch. For the rFEED scheme, query a supersedes another query b if and only if rank a is greater than rank b ($R_a>R_b$). Therefore using equation $R_q=1/p_q+Kw_q$ and assuming $\Delta_a=\Delta_b=1$, then $1/p_a+Kw_a>1/p_b+Kw_b$ so that $K<((p_b-p_a)/p_b p_a)\cdot(1/(w_b-w_a))$.

First considering effectiveness, if the query of the largest size arrives at time $t_q=t$, for effectiveness any query that arrives at time t±t and for simplicity assuming t±1) is desired to have a higher rank than the largest query. Using expression $K<((p_b-p_a)/p_b p_a)\cdot(1/(w_b-w_a))$ and assuming query a has the size $\psi$, then $K<(\psi-p_b)/\delta_t \psi p_b$. As the value of $p_b$ increases, the value of K decreases. To ensure that all queries are able to overtake the largest query with size $\psi$, a lower bound is set for constant K which is obtained with $p_b=\psi-1$, the size of the second smallest query. Thus the first bound for constant K is set as $K<1/\delta_t \psi(\psi-1)$. As the value of K decreases the system becomes more and more unfair. For example, a stipulation that any query b, even if arriving at time t+2, should be able to overtake query a of size 1 arriving at time t so that $\delta_t=2$, leads to a result that $K<1/(2\psi(\psi-\epsilon))$. The consequence is $\delta_t$ goes to infinity and K goes to zero, a result that follows the intuition that as K tends to zero the system behaves more and more like a SJF system, which though being highly effective is also very unfair. To obtain a fair behavior while maintaining effectiveness, K can be equated to an upper bound which can be obtained by $\delta_t=1$, resulting in the expression $K<1/(\psi(\psi-1))\approx 1/\psi^2$. Thus, K can be assigned as the inverse of the square of the largest query size, where query sizes are normalized by the size of the smallest query.

Since $\psi>1$, then $1/(\psi(\psi-1))$ is always greater than $1-1/\psi$, therefore the rFEED MWS does not behave as a FIFO and since K≠0, rFEED never behaves as an SJF.

Another aspect of the mixed workload scheduler is avoidance of starvation. A problem with scheduling algorithms can be starvation in which a query never is allowed to execute. Shortest-job-first (SJF) operation, which is known to be optimal for the non-preemptive case of average flow time, can suffer from starvation in an online scenario because some long running job might never be granted a turn to execute. An operating system can address starvation in a process called aging, in which a process waits for a long time has priority increased.

The illustrative rFEED implementation never causes starvation. The rank of a newly arrived query is $\Delta_q/p$ which is largest for the query with the smallest processing time p=1 and the largest value of $\Delta_q=\Delta_{max}$ in which case the rank is $\Delta_{max}$. The longest a query has to wait before the query's rank becomes $\Delta_{max}$ is $\Delta_q/p+Kw=\Delta_{max}$ so that $w=(1/K)(\Delta_{max}-\Delta_q/p)$. Thus the largest value for waiting time w is $(1/K)(\Delta_{max}-\Delta_q/\psi)$ where $\psi$ is the size of the largest query. After waiting for duration $\psi$ a query q necessarily has a higher rank than any incoming query and is the first to be executed.

The illustrative rFEED implementation can also consider mapping of service levels. Service levels are mapped to quality-of-service (QoS) requirements. Accordingly, for example $\Delta_q$ in equation $R_q=\Delta_q/p_q+Kw_q$ is mapped to QoS.

Service level requirements can be in various forms but very often are specified in terms of system performance so that a query a from a higher service level is to receive r times the system resources in comparison to a query b from a lower service level. Service level thus directly translates to query performance wherein for two same-sized queries a and b, query a from a higher service level has a stretch that is one times the stretch of query b from a lower service level. The service level requirement is defined as a value of $\Delta_q$ for a query to achieve a particular QoS.

For the case of two normalized service levels 1 and $\Delta_q$ and considering the case of $N_1$ queries with a normalized service level of 1, and $N_\Delta$ queries with a normalized service level of $\Delta$, a query is considered with execution time slightly greater than p+$\epsilon$, where $\epsilon$ is an arbitrary small number. Having a normalized service level $\Delta_q=\Delta$ means that the rank of a newly arrived query of size p from $\Delta_q=1$ is the same as the rank of a newly arrived query of size $p\Delta$ from $\Delta_q=\Delta$.

The ratio r of stretches of a query of size p+$\epsilon$ for the two different service levels enable mapping to service level requirements. In the analysis hereinafter all terms with subscript $\Delta$ means that the mapping is $\Delta_q=\Delta$. For example, with a subscript 1, the mapping is $\Delta_q=1$.

From the equation $S_j=(t-a_j)/p_j$, the stretch is depends on known values for waiting times and processing times. Analysis can be based on an assumption that all queries arrive at the same time. The waiting time of a query q is thus the sum of execution times of all the queries that would be executed before query q based on the rank function. For example, assuming three queries $\{q_1, q_2, q_3\}$ with respective execution times $\{1, 2, 3\}$, all at the same service level. According to the rank function, the order of execution is $\{q_1, q_2, q_3\}$. Then the wait time for $q_1$ is 0, for $q_2$ is 1, and for $q_3$ is 1+2=3. Once the waiting time is computed, computing the stretch is straightforward.

Considering a query of size p+$\epsilon$, and a query with $\Delta_q=1$, the total waiting time for a query of size p+$\epsilon$ is the sum of quantities: (1) the total execution time $T_{1,p}$ of all queries with $\Delta_q=1$ which have a processing time less than or equal to p; and (2) the total execution time $T_{\Delta,p\Delta}$ of all queries with $\Delta_q=\Delta$ which have a processing time less than or equal to $p\Delta$. The rank function is used to compute the total execution time $T_{\Delta,p\Delta}$. A query with $\Delta_q=\Delta$ is executed before query with $\Delta_q=1$ if $R_\Delta>R_1$. Since the waiting time at the time of insertion is zero for all queries, then $\Delta/p_\Delta>1/p_1$ so that $p\Delta<p_1\Delta$. Accordingly, all queries with a normalized service level $\Delta$ with size up to and including $p\Delta$ are executed before the query of size p+$\epsilon$ with normalized service level 1.

Similarly, for a query with $\Delta_q=\Delta$, the total waiting time is the sum of the quantities (1) the total execution time $T_{\Delta,p}$ of all queries with $\Delta_q=\Delta$ which have a processing time less than or equal to p; and (2) the total execution time $T_{\Delta,p/\Delta}$ of all queries with $\Delta_q=1$ which have a processing time less than or equal to $p/\Delta$. A query with $\Delta_q=1$ is executed before a query with $\Delta_q=\Delta$ if $R_1>R_\Delta$. Since the waiting time at the time of insertion is zero for all queries, then $1/p_1>\Delta/p_\Delta$ so that $p_1<p_1/\Delta$. Accordingly, all queries with normalized service level Δ with size up to and including p/Δ are executed before the query of size p+ε with normalized service level 1.

The ratio r of the stretches for a query of size p+ε with normalized service level Δ to that of a query of size p+ε with normalized service level 1 is, for ε proceeding to 0, $r=(T_{1,p}+T_{\Delta,p}+p)/(T_{\Delta,p}+T_{\Delta,p/\Delta}+p)$. The quantity $T_{\Delta,p/\Delta}$ is zero for all p/Δ<1 so that no queries exist with a size smaller than 1.

Distributions of the query can be modeled using a specified distribution and a closed form for normalized service level Δ can be obtained. For example, for a Pareto distribution with minimum value 1 and Pareto Index 1 using the analysis described hereinabove, the result is:

$$\Delta = e^{\frac{(r-1)N_1 \ln p + N_\Delta \ln p + p}{N_\Delta + rN_2}}.$$

A similar computation can be performed for the ratio of waiting times to attain a more simplified expression.

For example, QoS can have the form in which, for an average size query, a query from a higher service level should have a wait time of less than r as compared to a query from a lower service level. To compute Δ for the QoS, $N_1$ is assumed to be equal to $N_\Delta$. Thus:

$$r = \frac{\ln p + \ln p\Delta}{\ln \frac{p}{\Delta} + \ln p};$$

$$r = \frac{\ln p^2 \Delta}{\ln \frac{p^2}{\Delta}};$$

$$\ln p^2 \Delta = r \ln \frac{p^2}{\Delta};$$

$$\Delta = p^{\frac{2(r-1)}{r+1}}.$$

Thus, in an example with an average size of 10 and r=3, then Δ=10 so that the waiting time of a query of size 10 and normalized service level 3 is one-tenth the waiting time of corresponding query of size 10 but with a normalized service level of 1.

In an example analysis, Δ can be computed for a Pareto Distribution. The computation of Δ can be performed for any suitable statistical distribution which, for example can be assumed to be the Pareto distribution. The methodology for computing Δ is general and can be used with any distribution.

A Pareto distribution can be considered in which the minimum value is 1 and the Pareto Index is also 1, resulting in a frequency distribution described according to the equation $f(x)=1/x^2$. In an example analysis, multiple queries |S| are assumed to arrive at time t=0 and are from two different service levels, one with service level modifier $\Delta_q=1$ and the other with service level modifier $\Delta_q=\Delta$.

The total execution time of queries with execution time less than or equal to, for example t, is computed to produce a quantity $T_t$. Quantity $T_t$ can be computed, for example, for a sample of size S that follows the Pareto distribution. If $|S_t|$ is the number of queries with execution time less than t and the expected value is $E(S_t)$, then $T_t=(|S_t|)E_t$. $|S_t|$ is first computed according to equation:

$$|S_t| = |S| \int_1^t \frac{1}{x^2} \rightarrow |S_t| = |S|\left(1 - \frac{1}{t}\right).$$

To compute $E(S_t)$, a truncated Pareto distribution is considered with a maximum value of the random variable of t. A truncated distribution has the form f(x)/F(x) where F is the cumulative distribution function. Thus, $$E(S_t) = \frac{\int_1^t x \frac{1}{x^2} dx}{\int_1^t x} \rightarrow E(S_t) = \frac{\ln t}{1 - \frac{1}{t}}.$$

Solving for $T_t$ yields $T_t=|S_t|E(S_t)$ so that $T_t=|S|\ln t$.

The ratio of interest r can be computed as the ratio of stretches for a query from Δ=1 and execution time p to Δ=Δ, and execution time p.

Assuming $N_1$ is the number of queries with Δ=1 and $N_\Delta$ is the number of queries with Δ=Δ. Then the ratio can be expressed as $r=(N_1 \ln p + N_\Delta \ln p\Delta + p)/(N_1 \ln p/\Delta + N_\Delta \ln p + p)$. The first term in the denominator is zero if p<Δ, enabling computation of Δ, thus:

$$\ln\Delta(N_\Delta + rN_1) = \ln p((r-1)(N_\Delta + N_1)) + (r-1)p;$$

so that $$\Delta = e^{\frac{(r-1)(N_1 \ln p + N_\Delta \ln p + p)}{N_\Delta + rN_1}}.$$

Advantages of the rFEED system and technique illustrate performance in terms of the desired FEED properties of fairness, effectiveness, and differentiation. The fourth property of efficiency is combined into the rank function.

Performance of the rFEED system and method can be analyzed in comparison to a resource share system in terms of execution times, optimizer cost estimates, and actual processing times. Each analysis can include comparison of $I_2$ norms for stretch in combination with average values of stretch.

The $I_2$ norm for stretch can be considered a single metric by for simultaneously measuring fairness and effectiveness. The aspects of fairness and effectiveness can be contradictory such that a fair system can be ineffective or an effective system can be unfair. Effectiveness can be understood as the average case performance and hence is measured by the average value and fairness can be thought of as the worst-case performance and measured by the maximum value. The $I_2$ norm for stretch captures both.

A common trade-off between the average case and the worst-case performance is the $I_2$ norm [1, 2]. The $I_2$ norm for stretch can be used to demonstrate goodness of our performance. The $I_2$ norm for stretch, for a set of queries $\{q_i: i=1 \ldots n\}$ with stretches $\{s_i: i=1 \ldots n\}$, is defined as.

$$\sqrt{\left(\sum_1^n s_i^2\right)}$$

The goal of a good MWS is to lower the $I_2$ norm for stretch, the metric that can be used to compare rFEED with, for example, a resource share system. In analysis, the $I_2$ norm for stretch for rFEED is found to be consistently less than that for the resource share system, sometimes by an order of magnitude.

From analysis, rFEED performs better than a resource sharing system for the $I_2$ norm of stretch under various experimental conditions. For a peak load scenario where waiting queues can be long, rFEED performs significantly better than a resource share system. Both $rFEED_1$ and $rFEED_{10}$ enable differentiation, with $rFEED_{10}$ enabling greater differentiation. Differentiation is attained without a large cost to the overall results. rFEED is robust to moderate misestimates in processing times. rFEED performs significantly better than the resource sharing system even when the average value of stretch is used as a metric.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A controller-executed method for scheduling mixed workloads comprising:
    balancing average stretch and maximum stretch of scheduled queries wherein query stretch is defined as a ratio of a sum of wait time and execution time to execution time of a query;
    modifying scheduling of queries in response to the balancing according to service level differentiation; and
    determining which query of a plurality of queries is to be executed by a database management system comprising:
        maintaining a single queue of queries for selection for execution by the database management system,
        assigning a rank to the query entries on the queue, wherein a higher rank is assigned to the query entries in order of lesser execution time,
        ordering the query entries on the queue according to the rank, and
        selecting a query of highest rank for execution in the database management system.

2. The method according to claim 1, wherein assigning rank further comprises using an assigning technique selected from a group consisting of:
    for query entries on the queue with like execution time, assigning higher rank to query entries on the queue in order of higher current wait time;
    assigning higher rank to query entries on the queue in order of lesser execution time, and adding an increment to the assigned rank in proportion to current wait time; and
    adding the increment to the assigned rank in proportion to current wait time wherein a proportional constant is less than an inverse of the square of a largest query size.

3. The method according to claim 1, further comprising:
    differentiating rank of queries according to quality of service (QoS) comprising:
        multiplying inverse of query execution time by normalized query service level.

4. A workload management system comprising:
    a non-transitory controller-usable medium having a computer readable program code for scheduling mixed workloads; and
    a scheduler configured for scheduling mixed workloads comprising:
        an analyzer that executes the program code to detect execution time and wait time of a plurality of queries and balances average stretch and maximum stretch of scheduled queries wherein query stretch is defined as a ratio of a sum of wait time and execution time to execution time of a query; and
        a schedule controller that executes the program code to modify scheduling of queries in response to the balance between average stretch and maximum stretch according to service level differentiation; and
        a scheduling server that determines which query of a plurality of queries is to be executed by a database management system by:
            maintaining a single queue of queries for selection for execution by the database management system,
            assigning a rank to the query entries on the queue, wherein a higher rank is assigned to the query entries in order of lesser execution time,
            ordering the query entries on the queue according to the rank, and
            selecting a query of highest rank for execution in the database management system.

5. The system according to claim 4, wherein the scheduling server comprises:
    a controller configured to execute the scheduler;
    a memory coupled to the controller comprising a priority queue holding the scheduled queries; and
    a network interface coupled to the controller that interfaces the scheduling server to a plurality of clients via a network.

6. The system according to claim 4 further comprising:
    the scheduler assigning higher rank to query entries on the queue in order of higher current wait time for query entries on the queue with like execution time.

7. The system according to claim 4 further comprising:

the scheduler assigning higher rank to query entries on the queue in order of lesser execution time, and adding an increment to the assigned rank in proportion to current waiting time.

8. The system according to claim 7 further comprising:

the scheduler adding the increment to the assigned rank in proportion to current wait time wherein a proportional constant is less than an inverse of the square of a largest query size.

9. The system according to claim 4 further comprising:

the scheduler differentiating rank of queries according to quality of service (QoS) comprising multiplying inverse of query execution time by normalized query service level.

10. The system according to claim 4 further comprising:

an article of manufacture comprising:
- a non-transitory controller-usable medium having a computer readable program code embodied in a controller for scheduling mixed workloads, the computer readable program code further comprising:
  - code causing the controller to balance average stretch and maximum stretch of scheduled queries; and
  - code causing the controller to modify scheduling of queries in response to the balance between average stretch and maximum stretch according to service level differentiation.

11. A data warehouse server comprising:

a non-transitory controller-usable medium having a computer readable program code for scheduling mixed workloads;

a data warehouse controller;

a plurality of workloads communicatively coupled to the data warehouse controller; and a scheduler coupled to the data warehouse controller configured for scheduling mixed workloads comprising:
- an analyzer that executes the program code to detect execution time and wait time of a plurality of queries and balances average stretch and maximum stretch of scheduled queries wherein query stretch is defined as a ratio of a sum of wait time and execution time to execution time of a query;
- a schedule controller that executes the program code to modify scheduling of queries in response to the balance between average stretch and maximum stretch according to service level differentiation; and
- a scheduling server configured for scheduling queries for execution by the data warehouse controller comprising:
  - a priority queue that queues the plurality of queries for execution by the data warehouse controller; and
  - the scheduler maintaining the priority queue as a single queue of queries for selection for execution by the data warehouse controller, assigns a rank to the query entries on the queue, wherein a higher rank is assigned to the query entries in order of lesser execution time, orders the query entries on the queue according to the rank, and selects a query of highest rank for execution in the data warehouse controller.

* * * * *